United States Patent [19]

Maurer

[11] 4,161,770
[45] Jul. 17, 1979

[54] GUIDE SIGNAL DEVICES
[75] Inventor: Urs Maurer, Dietlikon, Switzerland
[73] Assignee: Erni & Co., Elektroindustrie, Zurich, Switzerland
[21] Appl. No.: 834,841
[22] Filed: Sep. 19, 1977
[30] Foreign Application Priority Data
Sep. 17, 1976 [CH] Switzerland .................. 011784/76
[51] Int. Cl.² ........................................... F21V 7/00
[52] U.S. Cl. .................................... 362/309; 362/62; 362/339
[58] Field of Search ............... 362/157, 267, 337, 339, 362/62, 299, 307–309
[56] References Cited
U.S. PATENT DOCUMENTS
2,934,633  4/1960  Cumming ........................... 362/267

| 2,990,419 | 6/1961 | Bernard | 362/339 |
| 3,200,243 | 8/1965 | McDevitt et al. | 362/153 |
| 3,466,435 | 9/1969 | Brunner | 362/267 |
| 3,697,736 | 10/1972 | Frederiksen | 362/339 |

Primary Examiner—Peter A. Nelson
Attorney, Agent, or Firm—Watson, Leavenworth, Kelton & Taggart

[57] ABSTRACT

A device for producing an optical guide signal is disclosed. This device is particularly suitable for installation in airport runways and comprises a covered housing containing a light source and a prism wherein a portion of the prism projects above the cover of the housing such that light emitted from the source is both transmitted through the prism and is also internally reflected within the prism before emerging at one of the surfaces of the said projecting portion of the prism.

10 Claims, 3 Drawing Figures

GUIDE SIGNAL DEVICES

BACKGROUND OF THE INVENTION

This invention relates to a device for producing an optical guide signal. Devices of this type are used mainly for installation in landing and taxi paths at airports and find their application in designating both the centre and also the edges of the taxi and landing paths.

Many requirements are imposed on guide signal devices of this type. They must indicate the course of the landing or taxi paths, they must be visible from defined directions, they must possess a high degree of operational reliability and they must comply with international and national regulations.

Numerous forms of construction of such devices are known. The main problem associated with such devices lies in providing the required lighting performance. The enormous loading occurring under an aircraft has led to extremely massive and cumbersome designs which detract from the optical performance of these prior art devices. In order to compensate for this loss of optical performance, the performance of the light source must be increased, and this, in turn, leads to the problem of dissipating heat which results in further demands upon the design of the device.

SUMMARY OF INVENTION

The underlying objective of the present invention is to create a guide signal device which is particularly useful for being laid in a runway, especially for landing and taxi paths at airports, and which possess the highest possible performance for a relatively low power consumption.

This objective is achieved by a guide signal installation comprising a light source situated beneath the runway, which is distinguished by the fact that the light emitted from the light source is conducted through a single prism, partially projecting above the runway, the surfaces of which, projecting partially above a cover plate, serve both for reflecting and also for transmitting the light.

It is especially advantageous if the light entry surface of the prism is so ground that focussing of the light also takes place.

DESCRIPTION OF THE PREFERRED EMBODIMENT

Figure 1:
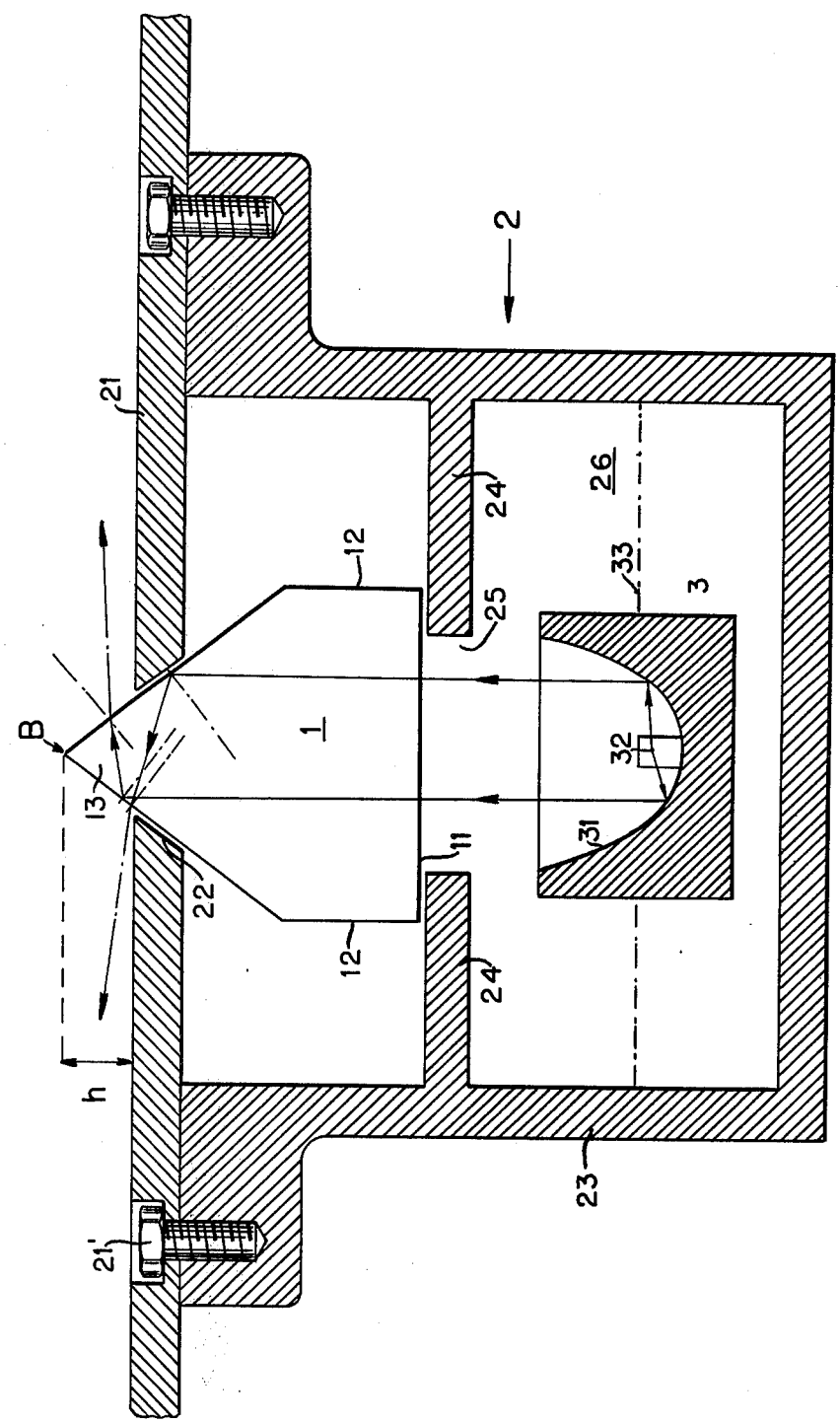
FIG. 1 shows a light signal device comprising a prism with a flat ground light entry surface.

Referring to the drawings, FIG. 1 shows one embodiment of the device of the present invention. Reference 1 designates the core of the device, that is the prism. This comprises a flat ground surface 11, through which the light emitted by the light source enters the prism. The four lateral surfaces 12 extend perpendicularly to this plane surface 11. The cross-sectional shape of the uppermost part of the prism is an isosceles triangle, the apex B of which projects above a cover plate 21, which lies flush with the surface of the landing path or taxi path. The height h is in accordance with official guidelines.

The housing 2 consists basically of a box-shaped component 23 which is divided into an upper and lower section by an intermediate floor 24. Cover plate 21 includes an aperture 22 having a shape corresponding to that part of the prism passing through it. The plate 21 is detachably connected to the box by screws 21'. The cover plate must withstand the enormous loadings which occur when an aircraft runs over it, and must be correspondingly dimensioned.

The intermediate floor 24 comprises an aperture 25 through which light passes into the prism from the lower section 26 of the box 23. The prism 1 lies with its plane surface 11 on the edge of the aperture 25.

In the lower section 26, a reflector 3 having a parabolic concave mirror 31 is disposed. At the focal point of mirror 31, there is a quartz lamp 32, serving as light source. The entire reflector is pivotally and movably journalled about an axis 33. The reflector may also be displaced axially along axis 33 in either direction. Pivoting of the reflector 3 about this axis results in a change of the angle between the two beams of light emerging from the opposing inclined surfaces of the mirror.

Generally, the center-lines of the two emerging light beams lie in one vertical plane. Under certain circumstances, however it may be desirable to tilt this plane a little.

Figure 2:
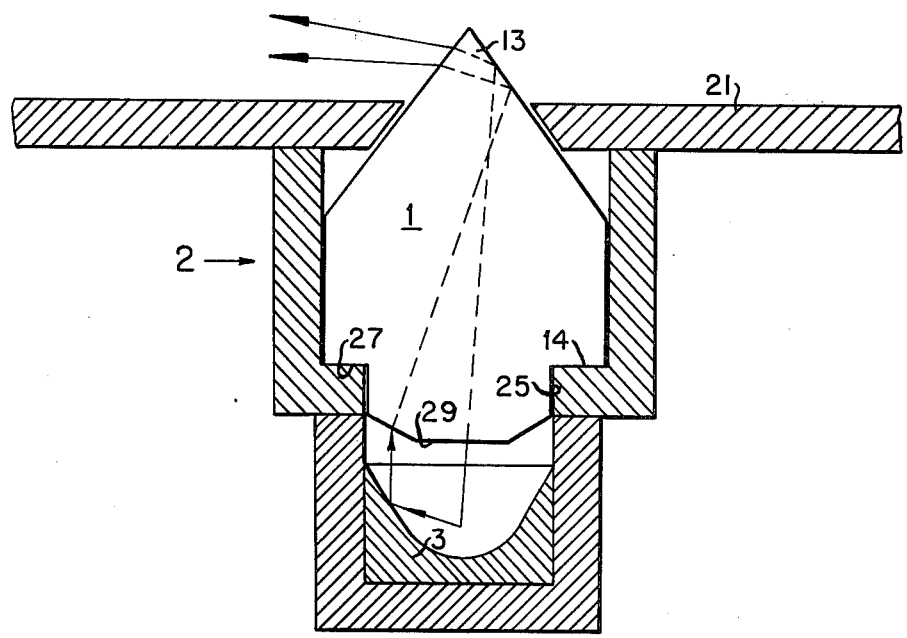
FIG. 2 is another embodiment of the device shown with another prism.

FIG. 2 (where like reference numerals denote like parts) shows a variation of the device shown in FIG. 1. Here, the basic shape of the prism has been partly modified and the housing correspondingly adapted. The base surface 11 of the prism 1 penetrates down through the aperture 25 and is chamfered at the sides 29 in order to obtain focussing of the light from reflector 3. In addition, the upper part of the box-shaped housing is adapted in its size so that it fits closely around prism 1. Thus, any pressure acting upon prism 1 is accepted by its shoulders 14, which rest upon a collar 27 of the housing. The housing walls of the lower section are also set back in such a way that they stand directly beneath the shoulders 14 of the prism and collar 27 and can accept the entire pressure.

In certain circumstances, it may be more advantageous for economical reasons to manufacture the prism with a plane base surface 11 (as in FIG. 1) and to obtain the focussing of the light with optical aids, such as prisms or lenses.

Figure 3:
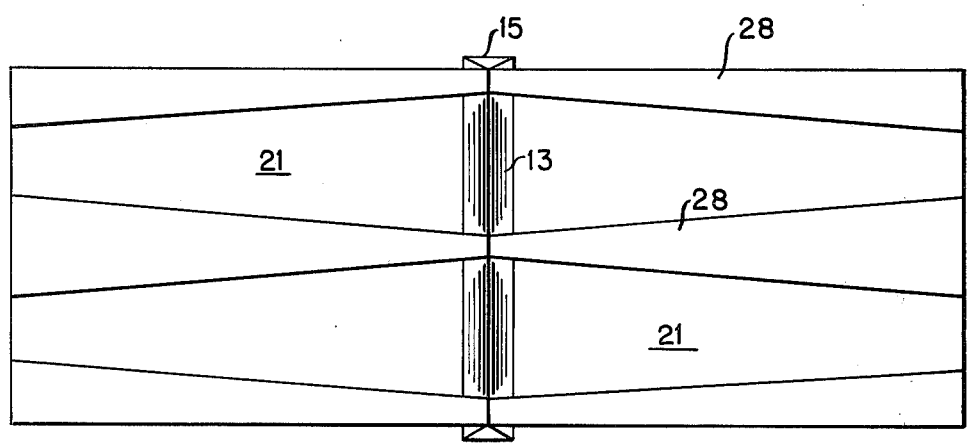
FIG. 3 is a plan view of the device laid in a runway.

It may also be desirable to provide the guide signals with ramps 28 as shown in the plan view of FIG. 3. Additionally, prism 1 may also possess, at its apex 13 which projects above the runway, lateral surfaces 15 which provide for better light transmission.

If the entire device is set somewhat deeper in the runway so that the prism no longer projects above the runway, a surface flush with the plane of the runway can be screwed onto the device by a metal construction, known in the art as a grooved plate. The grooved plate is located on top of the cover plate to facilitate emergence of the light from the prism. However, the possibilities of optical variation are thereby limited. Where desired, the cover plate may be formed integrally with the groove plate.

The prism may also be provided with a suitably dimensioned plane surface at the apex, which can, if desired, emit light upwards.

The advantage of the device according to this invention lies in the large number of optical requirements which can be satisfied with the same basic form of construction and design by the use of different ground prisms or other optical aids, without modifying the design. For example, by changing the angle at the apex of the prism, it is possible for the angle of emergence of the light relative to the horizontal to be varied. By the focussing of the light, a greater light intensity can be achieved, and by grinding further surfaces, special effects can also be attained.

In FIG. 1, it can be seen that light ray X is reflected at surface AB of the prism 1 before emerging at surface BC. Similarly, the ray Y is internally reflected at surface BC before emerging at surface AB.

In FIG. 2, light ray P is refracted at the chamfered surface 29 of the prism and is then internally reflected at surface BC before emerging at surface AB. The ray P is also focussed at F with the direct ray Q from source 32.

I claim:

1. A guide signal device suitable for mounting in airport runways or taxiways comprising a covered housing situated beneath ground level of the runway or taxiway having its cover substantially flush with the ground containing a light source and a prism, said light source being located below the prism and a portion of said prism projecting above the cover of said housing, said projecting portion of the prism having a cross-sectional profile of an isosceles triangle which includes two planar surfaces converging together to form an apex of the triangle, a portion of said surfaces projecting above the cover plate of the housing wherein light emerging from the light source is both transmitted through and internally reflected from one of the said planar surfaces, the planes forming an apex angle such that the reflected light from the one surface is internally reflected towards the other surface where the light is transmitted through the prism in a desired direction.

2. A guide signal device suitable for mounting in airport runways or taxiways comprising a covered housing situated beneath ground level of the runway or taxiway having its cover substantially flush with the ground containing a light source situated at the focal point of a pivotable and displaceable parabolic reflector and a prism, said light source located below the prism emitting incident light which is received by a surface of the prism which is filed such that focusing of the light takes place, a portion of said prism projecting above the cover of said housing, said projecting portion of the prism having a cross-sectional profile of an isosceles triangle which includes two planar surfaces converging together to form an apex of the triangle, a portion of said surfaces projecting above the cover plate of the housing wherein light emerging from the light source is both transmitted through and internally reflected from one of the said planar surfaces, the planar surfaces forming an apex angle and extending beneath the cover of the housing such that the reflected light from the one surface is internally reflected at the portion of the surface extending beneath the cover towards the other surface where the light is transmitted through the prism in a desired direction.

3. The device of claim 1 wherein ramps are situated on the ground and lead up to the said projecting portion of the prism, the ramps rising to a height substantially equal to the height to which the prism extends above ground level.

4. The device of claim 1 wherein the said surfaces of the projecting portion of the prism extend beneath the cover of the housing such that the said internal reclection of light within the prism occurs at the said surfaces.

5. The device of claim 1 wherein a surface of the prism which receives incident light from the light source is filed such that focussing of the light takes place.

6. The device of claim 1 wherein the light source is situated at the focal point of a parabolic reflector.

7. The device of claim 6 wherein the reflector is pivotally mounted.

8. The device of claim 6 wherein the reflector is displaceably mounted.

9. The device of claim 1 wherein the covered housing and the projecting portion of the prism are situated beneath ground level, a grooved plate being located on top of the cover plate to facilitate emergence of the light from the prism.

10. The device of claim 9 wherein the cover plate is formed integrally with the grooved plate.

* * * * *